United States Patent [19]
Scott

[11] 4,384,551
[45] May 24, 1983

[54] CARBIDE POWERED ENGINE

[76] Inventor: Alan Scott, 307 3rd Ave., Carnegie, Pa. 15106

[21] Appl. No.: 285,152

[22] Filed: Jul. 20, 1981

[51] Int. Cl.³ .......................................... F02B 75/10
[52] U.S. Cl. .................................... 123/1 A; 60/673
[58] Field of Search .................. 60/649, 673; 123/1 A

[56] References Cited
U.S. PATENT DOCUMENTS 3,664,134  5/1972  Seitz ................................... 123/1 A
4,257,232  3/1981  Bell ...................................... 60/676

Primary Examiner—Allen M. Ostrager
Attorney, Agent, or Firm—William J. Ruano

[57] ABSTRACT

A carbide-powered engine useful for automobiles and the like and comprising a water tank from which water is pumped into a pressure container enclosing a block of compressed carbide. Acetylene buildup in the container passes through an accelerator valve, connected to the throttle of the engine, and through an idler valve operated by an electro-magnet, both valves being spring pressed to the closed position. Upon attainment of a predetermined pressure in the manifold, the electro-magnet is de-energized to effect closing and complete sealing of the container.

2 Claims, 1 Drawing Figure

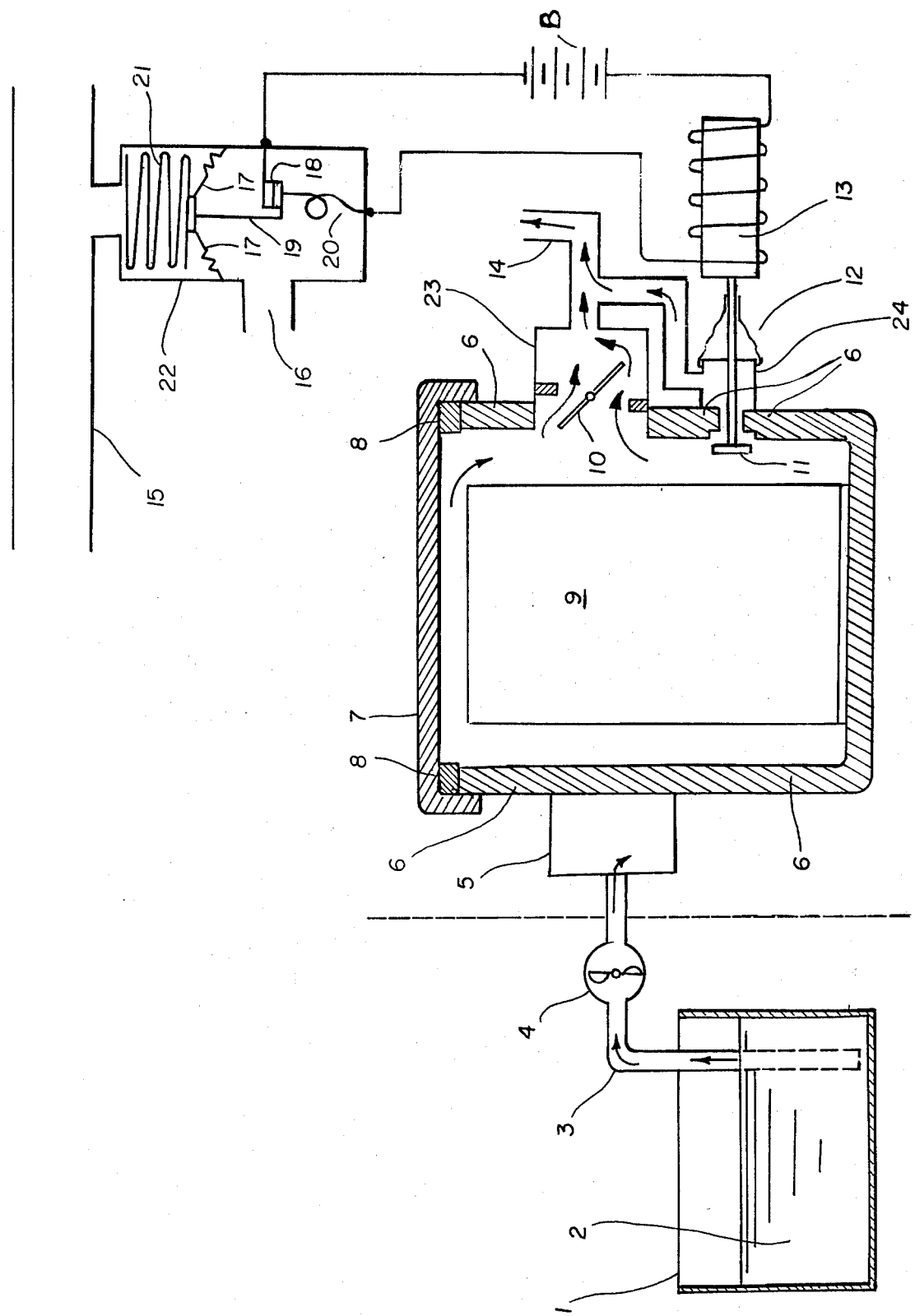

CARBIDE POWERED ENGINE

This invention relates to a carbide powered engine.

In the past, various types of engines have been devised for conventional fuels. However, all have had certain shortcomings or involved relatively expensive fuel. For example, while diesel fuel has been substituted for gasoline to run diesel engines, the latter have been noisy, particularly during starting.

An object of this invention is to provide a novel, carbide-powered engine that is devoid of disadvantages of existing engines and which is easy to control and inexpensive to operate.

Other objects and advantages of the invention will become more apparent from a study of the following description taken with the accompanying drawing wherein:

FIG. 1 is a schematic diagram of a carbide-powered engine embodying the present invention.

Referring more particularly to the drawing, numeral 1 denotes a water tank which may be mounted in the rear of an automobile and which contains a supply of water 2 into which extends a water line 3 through which water is drawn upwardly through a constant speed electric motor powered impeller 4, thence through a pressure actuated valve 5 mounted on a pressure container 6 which may be located in the engine compartment. A lid 7 is sealed to the top of the container 6 by pressure gasket 8. A compressed cylinder of calcium carbide 9 is located in container 6.

An accelerator valve 10 enclosed in housing 23 is connected to the throttle (not shown) for leading gas under pressure through outlet 14 leading to the carburetor.

Idle valve 11, enclosed by housing 24, is operated by solenoid 13 through a stem which is connected to a rubber boot 12. Idle valve 11 is actuated by a manifold pressure operated switch contained in housing 22 which is open to atmospheric pressure 16. The switch consists of a return spring 21, a diaphragm 17, a metal bar 19 connected to the diaphragm, contact points 18 and a standard wire 20 which connects contact points 18 to the outside of housing 22.

Solenoid 13 is energized by battery B when contact points 18 are closed as pressure in the intake manifold 15 drops when the engine is started.

The arrows in the accelerator valve housing indicate the path of acetylene gas flow. The arrows in the water line indicate the path of water flow.

In operation, when the ignition is turned on, impeller 4 forces open the valve 5, mixing water with the carbide 9. When the pressure from the resulting acetylene builds up in container 6, it closes valve 5. The impeller then cavitates.

When the ignition switch is turned to "start" and the throttle is depressed, both valves 10 and 11 are opened and the engine is started,—it being noted that both valves 10 and 11 are spring-loaded in the closed position.

When the ignition is turned off, the intake manifold pressure rises, opening contact points 18. This opens the circuit to solenoid 13 allowing valve 11 to close, sealing the pressure container.

The carbide powered engine described above is more practical for engines of large displacement. It does not lend itself to operation in below-freezing temperatures. However, alcohol could be mixed with the water or, once started, the engine heat could be used to keep the water from freezing. It is simple to refill and requires only a small pressure container which may be made of glass or any other suitable material.

Thus, it will be seen that I have provided a highly efficient carbide-powered engine made of relatively inexpensive parts and which is easy to control, start, and operate,—also which involves the use of relatively inexpensive fuel.

I claim:

1. A carbide-powered engine useful for driving an automobile including a manifold, a carburetor, and throttle comprising a tank containing water, a container enclosing carbide, means for pumping water from said tank to said container whereby the reaction between carbide and water forms acetylene gas, said container being sealed but having an idler valve for leading said gas to said carburetor, switch means responsive to the pressure of said manifold to operate said idler valve so that upon a predetermined pressure drop in the manifold, which occurs when starting the automobile engine, said idler valve will close to completely seal said container, and a valve operated by the accelerator pedal of the automobile to regulate the amount of additional flow of said acetylene gas to said carburetor.

2. Apparatus as recited in claim 1, wherein said switch means is open to atmospheric pressure and is connected to a diaphragm to which a return spring is connected.

* * * * *